(12) United States Patent
Crumpton et al.

(10) Patent No.: US 8,562,808 B2
(45) Date of Patent: Oct. 22, 2013

(54) POLYMER THICK FILM SILVER ELECTRODE COMPOSITION FOR USE AS A PLATING LINK

(75) Inventors: John C. Crumpton, Bahama, NC (US); Jay Robert Dorfman, Durham, NC (US)

(73) Assignee: E I du Pont de Nemours and Company, Wilmington, DE (US)

( * ) Notice: Subject to any disclaimer, the term of this patent is extended or adjusted under 35 U.S.C. 154(b) by 454 days.

(21) Appl. No.: 12/884,517

(22) Filed: Sep. 17, 2010

(65) Prior Publication Data

US 2011/0068011 A1    Mar. 24, 2011

Related U.S. Application Data

(60) Provisional application No. 61/299,000, filed on Jan. 28, 2010, provisional application No. 61/245,424, filed on Sep. 24, 2009.

(51) Int. Cl.
- *C25D 5/00* (2006.01)
- *C25D 7/00* (2006.01)
- *C08K 3/08* (2006.01)

(52) U.S. Cl.
USPC ............. 205/80; 524/366; 524/376; 524/403; 524/556

(58) Field of Classification Search
USPC ................................. 524/403, 556
See application file for complete search history.

(56) References Cited

U.S. PATENT DOCUMENTS

| | | | |
|---|---|---|---|
| 4,371,459 A * | 2/1983 | Nazarenko | 252/514 |
| 4,595,606 A * | 6/1986 | St. John et al. | 427/98.4 |
| 5,049,313 A | 9/1991 | Frentzel | |
| 5,049,480 A * | 9/1991 | Nebe et al. | 430/281.1 |
| 5,470,643 A * | 11/1995 | Dorfman | 428/206 |
| 5,928,571 A * | 7/1999 | Chan | 252/514 |
| 2002/0145132 A1 | 10/2002 | Won et al. | |
| 2004/0144958 A1* | 7/2004 | Conaghan et al. | 252/500 |
| 2006/0043343 A1 | 3/2006 | Chacko | |
| 2006/0231805 A1 | 10/2006 | Wang et al. | |

FOREIGN PATENT DOCUMENTS

| | | |
|---|---|---|
| CN | 1660597 A | 8/2005 |
| CN | 101012369 A | 8/2007 |
| CN | 101395233 A | 3/2009 |
| DE | 10 2006 045052 A1 | 3/2008 |
| DE | 10 2007 037079 A1 | 4/2008 |
| WO | 2010/067948 A1 | 6/2010 |
| WO | 2010/067949 A1 | 6/2010 |
| WO | 2010/101418 A2 | 9/2010 |

OTHER PUBLICATIONS

International Search Report for International Application No. PCT/US2010/049289 Dated Dec. 10, 2010.

* cited by examiner

*Primary Examiner* — Vu A Nguyen

(57) ABSTRACT

The invention is directed to a polymer thick film silver composition comprising: (a) conductive silver flakes and (b) an organic medium consisting of (1) acrylic organic polymeric binder; and (2) organic solvent. The composition may be processed at a time and energy sufficient to remove all solvent. The invention is further directed to novel method(s) of circuitry formation on printed wiring board constructions.

14 Claims, No Drawings

POLYMER THICK FILM SILVER ELECTRODE COMPOSITION FOR USE AS A PLATING LINK

FIELD OF THE INVENTION

The invention is directed to a polymer thick film (PTF) silver conductor composition for use as a plating link. In one embodiment, the PTF silver composition is used as a screen-printed pattern on top of a copper-clad printed wiring board (PWB) and in combination with a standard photoresist can be used to reduce process steps in the electroplating buildup of circuitry on the PWB.

BACKGROUND OF THE INVENTION

Historically producers of printed circuit boards have used several techniques for selectively electroplating circuitry. One of the more common practices was to leave circuitry electrically connected after the initial conductor patterning process. Once the selective circuitry was electroplated additional masking and etching steps were required to remove the electrical connections. Sometimes electrical connections were made using buried conductor which were not a functional part of the finished electrical circuit. The buried connections often limited the area available for routing functional circuitry and caused concerns about signal interference in high frequency applications.

There is a continuing need for a composition that can be used to form a removable conductive link for electroplating applications for printed wiring circuit boards

SUMMARY OF THE INVENTION

The invention is directed to a polymer thick film silver composition comprising:
 (a) 60 to 92 weight percent silver flakes; and
 (b) 8 to 40 weight percent organic medium comprising:
  i. 1 to 6 weight percent acrylic resin; and
  ii. an organic solvent;
wherein the acrylic resin is dissolved in the organic solvent and the silver flakes are dispersed in the organic medium and wherein the weight percentages are based on the total weight of the composition.

The invention is further directed to the use of such compositions for electrode formation on copper-clad circuit boards and the methods of doing so and to articles formed from such methods and compositions.

Use of such compositions may eliminate the need for bus bars and other connections to the copper.

DETAILED DESCRIPTION OF INVENTION

The invention provides a polymer thick film silver composition for use as a plating link on copper-clad printed wiring board circuitry, i.e., to form an electrode for use in the electroplating process. It is typically used so as to improve the efficiency of the construction of the layers of the printed wiring board construction. A pattern of silver is printed and dried on top of the copper clad substrate to serve as an electrode. The product eliminates the need for bus bars and other connections to the copper. This plating link provides a temporary silver connection and can subsequently be removed.

As such it reduces the cost of circuit build-up by eliminating steps in the electroplating process. The plating link silver composition and PWB circuitry must be processed at less than 200° C. since the substrate used in a PWB cannot withstand high temperatures. The use of a PTF Ag composition as the plating link fits this requirement since PTF compositions themselves are only stable up to approximately 200° C.

Generally, a thick film composition comprises a functional phase that imparts appropriate electrically functional properties to the composition. The functional phase comprises electrically functional powders dispersed in an organic medium that acts as a carrier for the functional phase. Generally, the composition is fired to burn out the organics and to impart the electrically functional properties. However, in the case of polymer thick films, the polymer or resin component remains as an integral part of the composition after drying and only the solvent is removed.

The main components of the thick film conductor composition are a conductive powder dispersed in an organic medium that comprises polymer resin and solvent. The components are discussed in more detail herein below.

A. Conductive Powder

The conductive powders in the present thick film composition are Ag conductor powders and may comprise Ag metal powder, alloys of Ag metal powder, or mixtures thereof. Various particle diameters and shapes of the metal powder particles are contemplated. In an embodiment, the conductive powder may include any shape silver powder, including spherical particles, flakes, rods, cones, plates and mixtures thereof. In one embodiment, the conductive powder comprises silver flakes. In an embodiment, flakes is meant as thin, flat particles wherein the two lateral dimensions of the flakes are each at least 10 times the thickness. The particle sizes disclosed are those of the lateral dimensions.

In one embodiment, the particle size distribution of the silver powders is from 1 to 100 µm; in a further embodiment, from 2 to 12 µm and in still further embodiments, 2 to 10 µm. In one embodiment, the surface area/weight ratio of the silver particles is in the range of 0.1-1.0 m$^2$/g.

Furthermore, it is known that small amounts of other metals may be added to silver conductor compositions to improve the properties of the conductor. Some examples of such metals include gold, silver, copper, nickel, aluminum, platinum, palladium, molybdenum, tungsten, tantalum, tin, indium, lanthanum, gadolinium, boron, ruthenium, cobalt, titanium, yttrium, europium, gallium, sulfur, zinc, silicon, magnesium, barium, cerium, strontium, lead, antimony, conductive carbon, and combinations thereof and others common in the art of thick film compositions. The additional metal(s) may comprise up to about 1.0 percent by weight of the total composition.

In various embodiments, the silver flakes content is 60 to 92 wt %, 72 to 90 wt %, or 75 to 87 wt %, wherein the weight percentages (wt %) are based on the total weight of the composition.

B. Organic Medium

The powders are typically mixed with an organic medium (vehicle) by mechanical mixing to form a paste-like composition, called "paste", having suitable consistency and rheology for printing. The organic medium is comprised of a polymer resin dissolved in an organic solvent. The organic medium must be one in which the solids are dispersible with an adequate degree of stability. The rheological properties of the medium must be such that they lend good application properties to the composition. Such properties include: dispersion of solids with an adequate degree of stability, good application of composition, appropriate viscosity, thixotropy, appropriate wettability of the substrate and the solids, a good drying rate, and a dried film strength sufficient to withstand rough handling.

In various embodiments, the organic medium content is 8 to 40 wt %, 10 to 28 wt %, or 13 to 25 wt %, based on the total weight of the composition.

The polymer resin is selected from the group of acrylic resins since these acrylic resins allow high weight loading of silver flake and thus help achieve both good adhesion to PWB substrates, such as FR4 substrates, during the plating process and low resistivity, two critical properties for silver electrodes in plating link applications. FR-4 is an abbreviation for Flame Retardant 4 and is a type of material used for making a printed wiring board (PWB). It describes the board substrate, with no copper layer. Further, the composition must be strippable or removable using a typical photoresist solution of pH>10. In various embodiments, the acrylic resins content is 1 to 6 wt %, 1.4 to 5.6 wt %, or 1.5 to 2.5 wt %, based on the total weight of the composition. In still another embodiment, the total resin content is 1.6 to 2.2 wt %, based on the total weight of the composition.

A wide variety of inert liquids can be used as the solvent. Solvents suitable for use in the polymer thick film composition are recognized by one of skill in the art and include acetates and terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. In addition, volatile liquids for promoting rapid hardening after application on the substrate may be included in the vehicle. In many embodiments of the present invention, solvents such as glycol ethers, ketones, esters and other solvents of like boiling points, i.e., in the range of 180° C. to 250° C., and mixtures thereof may be used. The preferred organic mediums contain glycol ethers, beta-terpineol and alcohol esters. Various combinations of these and other solvents are formulated to obtain the viscosity and volatility requirements desired. Plasticizers may also be used as part of the organic medium.

Although screen-printing is expected to be a common method for the deposition of the polymer thick film silver composition, other conventional methods including stencil printing, syringe dispensing or other deposition or coating techniques may be utilized.

Application of Thick Films

The polymer thick film silver composition also known as a "paste" is typically deposited on a substrate, such as a copper-clad FR-4 board, that is impermeable to gases and moisture. The substrate can also be a sheet of flexible material, i.e., an impermeable plastic such as polyester, e.g. polyethylene terephthalate, or a composite material made up of a combination of plastic sheet with optional metallic or dielectric layers deposited thereupon. In one embodiment, the substrate can be a build-up of layers with a metalized copper surface FR-4 board followed by the polymer thick film silver conductor layer which is deposited in areas where desired and then dried to form an electrode. The polymer thick film silver composition is dried to remove the solvent. A photoresist is applied, imaged and developed to expose the areas of the substrate that will receive plating. The areas of the copper surface that are not to receive plating and the plating link electrode continue to be completely covered by the remaining photoresist. The substrate is then subjected to electroplating in the exposed copper surface areas where circuitry buildup is desired. The remaining photoresist and plating link PTF silver are then stripped off with a single solution. In one embodiment, the solution is a basic solution with pH>10, e.g., a sodium carbonate solution. The result is a buildup of circuitry corresponding to the desired pattern on the particular circuit.

The deposition of the polymer thick film silver composition is performed preferably by screen printing, although other deposition techniques such as stencil printing, syringe dispensing or coating techniques can be utilized. In the case of screen-printing, the screen mesh size controls the thickness of the deposited thick film.

The deposited thick film is dried by exposure to heat for typically 10-15 min at 80-90° C. The present invention will be discussed in further detail by giving a practical example. The scope of the present invention, however, is not limited in any way by the Example.

EXAMPLES

Example 1

The PTF silver electrode paste was prepared by mixing silver flake with an organic medium comprised of a solution of acrylic resin in an organic solvent.

Two acrylic resins, Acrylic Co-Polymer XPD1234, available from Noveon, Inc, and Elvacite®2051, a polymethyl methacrylate, available from Lucite International, Inc., were dissolved in a beta-terpineol (available from JT Baker) solvent to form the organic medium. The molecular weight of the first resin was approximately 6,000, while that of the second was approximately 400,000. Silver flakes with an average particle size of 5 µm and a range of particle sizes from 2 to 12 µm were mixed with the organic medium. The other ingredients were then added. The composition of the plating link silver conductor is given below:

| wt % | |
|---|---|
| 83.0 | Ag flake |
| 11.36 | beta-terpineol solvent |
| 3.50 | Santicizer 160, butyl benzyl phthalate (Ferro Corp.) |
| 1.74 | Acrylic Co-Polymer XPD1234 |
| 0.20 | Elvacite ® Resin 2051 |
| 0.17 | silicone flow additive |
| 0.03 | oxalic acid |

This composition was mixed for 30 minutes on a planetary mixer. The composition was then transferred to a three-roll mill where it was subjected to two passes at 100 and 200 psi. At this point, the composition was used to screen print a silver pattern on top of copper clad FR4 board substrates. A series of lines were printed using a 325 mesh stainless steel screen, and the silver paste was dried at 90° C. for 10 min. in a forced air box oven. The sheet resistivity was then measured as 60 milliohm/sq/mil. A Riston (DuPont Co.) photoresist was applied and imaged to correspond to the open areas of deposited plating link silver. The photoresist is applied, imaged and developed to expose the areas of the substrate that would receive plating. At this point electroplating would occur. A stripping solution of pH>10 sodium carbonate was used and both the photoresist and the plating link silver conductor were thoroughly removed leaving no trace of residue.

Example 2

The PTF silver electrode paste was prepared by mixing silver flake with an organic medium comprised of a solution of acrylic resin in an organic solvent.

Two acrylic resins, Acrylic Co-Polymer XPD1234, available from Noveon, Inc, and Elvacite®2051, a polymethyl methacrylate, available from Lucite International, Inc., were dissolved in Eastman Texanol™ ester alcohol (available from Eastman Chemical Company) solvent to form the organic medium. The molecular weight of the first resin was approximately 6,000, while that of the second was approximately 400,000. Silver flakes with an average particle size of 5 μm and a range of particle sizes from 2 to 12 μm were mixed with the organic medium. The other ingredients were then added. The composition of the plating link silver conductor is given below:

| wt % | |
|---|---|
| 79.7 | Ag flake |
| 18.28 | Eastman Texanol ™ ester alcohol |
| 1.62 | Acrylic Co-Polymer XPD1234 |
| 0.20 | Elvacite ® Resin 2051 |
| 0.17 | silicone flow additive |
| 0.03 | oxalic acid |

This composition was mixed for 30 minutes on a planetary mixer. The composition was then transferred to a three-roll mill where it was subjected to two passes at 100 and 200 psi. At this point, the composition was used to screen print a silver pattern on top of copper clad FR4 board substrates. A series of lines were printed using a 325 mesh stainless steel screen, and the silver paste was dried at 90° C. for 10 min. in a forced air box oven. The sheet resistivity was then measured as 60 milliohm/sq/mil. A Riston (DuPont Co.) photoresist was applied and imaged to correspond to the open areas of deposited plating link silver. The photoresist is applied, imaged and developed to expose the areas of the substrate that would receive plating. At this point electroplating would occur. A stripping solution of pH>10 sodium carbonate was used and both the photoresist and the plating link silver conductor were thoroughly removed leaving no trace of residue.

What is claimed is:

1. A polymer thick film silver composition comprising:
   (a) 60 to 92 wt % silver flakes; and
   (b) 8 to 40 wt % organic medium consisting of:
      i) 1.5 to 2.5 wt % acrylic resin; and
      ii) an organic solvent;
wherein said acrylic resin is dissolved in said organic solvent and said silver flakes are dispersed in said organic medium and wherein the weight percentages are based on the total weight of the composition.

2. The composition of claim 1, said composition comprising 72 to 90 wt % silver flakes and 10 to 28 wt % organic medium consisting of 1.5 to 2.5 wt % acrylic resin and an organic solvent.

3. The composition of claim 2, said composition comprising 75 to 87 wt % silver flakes and 13 to 25 wt % organic medium consisting of 1.6 to 2.2 wt % acrylic resin and an organic solvent.

4. The composition of claim 1, wherein said organic solvent is selected from the group consisting of glycol ethers, ester alcohols, beta-terpineol, and mixtures thereof.

5. The composition of claim 1, wherein said silver flakes have a size distribution of from 1 to 100 μm.

6. The composition of claim 5, wherein said silver flakes have a size distribution of from 2 to 12 μm.

7. The composition of claim 1, wherein said silver flakes have a surface area/weight ratio in the range of 0.1-1.0 $m^2/g$.

8. The composition of claim 1, wherein said composition, upon drying, is completely removable from a copper-clad substrate using a pH>10 stripping solution.

9. The composition of claim 8, wherein said pH>10 stripping solution is a sodium carbonate solution.

10. An improved electroplating process for a printed wiring circuit board, the improvement comprising using, as a plating link to form an electrode for use in said electroplating process, a polymer thick film silver composition comprising:
    (a) 60 to 92 wt % silver flakes; and
    (b) 8 to 40 wt % organic medium comprising of:
       i) 1.5 to 2.5 wt % acrylic resin; and
       ii) an organic solvent;
wherein said acrylic resin is dissolved in said organic solvent and said silver flakes are dispersed in said organic medium and wherein the weight percentages are based on the total weight of the composition.

11. The improved process of claim 10, wherein the printed wiring circuit board is copper-clad.

12. The improved process of claim 10, said composition comprising 72 to 90 wt % silver flakes, 10 to 28 wt % organic medium and 1.5 to 2.5 wt % acrylic resin.

13. The improved process of claim 12, said composition comprising 75 to 87 wt % silver flakes, 13 to 25 wt % organic medium and 1.6 to 2.2 wt % acrylic resin.

14. The improved process of claim 10, wherein said organic solvent is selected from the group consisting of glycol ethers, ester alcohols, beta-terpineol, and mixtures thereof.

* * * * *

UNITED STATES PATENT AND TRADEMARK OFFICE
CERTIFICATE OF CORRECTION

| | | |
|---|---|---|
| PATENT NO. | : 8,562,808 B2 | Page 1 of 1 |
| APPLICATION NO. | : 12/884517 | |
| DATED | : October 22, 2013 | |
| INVENTOR(S) | : John C Crumpton and Jay Robert Dorfman | |

It is certified that error appears in the above-identified patent and that said Letters Patent is hereby corrected as shown below:

In the Claims

Column 6, in Claim 10, Line 28, after the word "comprising", please delete the word "of".

Signed and Sealed this
Seventeenth Day of December, 2013

Margaret A. Focarino
*Commissioner for Patents of the United States Patent and Trademark Office*